United States Patent

Sonoda et al.

[11] Patent Number: 5,838,486
[45] Date of Patent: Nov. 17, 1998

[54] OPTICAL WAVELENGTH CONVERSION ELEMENT, METHOD OF MANUFACTURING THE SAME AND OPTICAL WAVELENGTH CONVERSION MODULE

[75] Inventors: Shinichiro Sonoda; Isao Tsuruma; Masami Hatori; Kenji Matsumoto, all of Kanagawa-ken, Japan

[73] Assignee: Fuji Photo Film Co., Ltd., Kanagawa-ken, Japan

[21] Appl. No.: 759,794

[22] Filed: Dec. 4, 1996

[30]     Foreign Application Priority Data

Dec. 8, 1995  [JP]  Japan ................................... 7-320731
Mar. 5, 1996  [JP]  Japan ................................... 8-047591

[51] Int. Cl.$^6$ ........................................................ G02F 1/35
[52] U.S. Cl. ........................................... 359/332; 385/122
[58] Field of Search .................................... 359/326, 328, 359/329, 332; 385/122; 372/21, 22

[56] References Cited

U.S. PATENT DOCUMENTS

| | | | |
|---|---|---|---|
| 5,412,502 | 5/1995 | Makio et al. | 359/332 |
| 5,415,743 | 5/1995 | Harada | 204/130 |
| 5,506,722 | 4/1996 | Mizuuchi et al. | 359/332 |
| 5,521,750 | 5/1996 | Onoe et al. | 359/332 |

FOREIGN PATENT DOCUMENTS

| | | | |
|---|---|---|---|
| 0 592 226 | 4/1994 | European Pat. Off. | G02F 1/37 |
| 5-29207 | 2/1993 | Japan | H01L 21/027 |
| 7-261213 | 10/1995 | Japan | G02F 1/37 |

OTHER PUBLICATIONS

"Interactions between Light Waves in a Nonlinear Dielectric"; Armstrong et al., Physical Review, vol. 127, No. 6, pp. 1918–1939 (1962) (Sep.).

*Primary Examiner*—John D. Lee
*Attorney, Agent, or Firm*—Sughrue, Mion, Zinn, Macpeak & Seas, PLLC

[57]              ABSTRACT

An optical wavelength conversion element includes an optical waveguide which is formed on a ferroelectric crystal substrate having a nonlinear optical effect and extends along one surface of the substrate, and domain reversals which are periodically formed in the optical waveguide and arranged in a direction. The orientation of the spontaneous polarization of the substrate is reversed in the domain reversals and the optical wavelength conversion element converts the wavelength of a fundamental wave travelling in the direction in which the domain reversals are arranged under the guidance of the optical waveguide. The orientation of the spontaneous polarization of the substrate is at an angle θ larger than 0° and smaller than 90° to the surface of the substrate in a plane normal to the direction in which the fundamental wave is guided.

14 Claims, 13 Drawing Sheets

OPTICAL WAVELENGTH CONVERSION ELEMENT, METHOD OF MANUFACTURING THE SAME AND OPTICAL WAVELENGTH CONVERSION MODULE

BACKGROUND OF THE INVENTION

1. Field of the Invention

This invention relates to an optical wavelength conversion element with an optical waveguide which converts a fundamental wave to a second harmonic, and more particularly to an optical wavelength conversion element in which an optical waveguide is formed on a ferroelectric crystal substrate and periodic domain reversals are formed in the optical waveguide. This invention further relates to a method of manufacturing such as an optical wavelength conversion element and an optical wavelength conversion module employing such an optical wavelength conversion element.

2. Description of the Related Art

There has been proposed by Bleombergen and et al. a method of converting a fundamental wave to a second harmonic by use of an optical wavelength conversion element formed with a region where the spontaneous polarization (domain) of a ferroelectric material having a nonlinear optical effect is periodically reversed. (See Phys. Rev., vol. 127, No. 6, 1918 (1962)) In this method, by setting pitches Λ of the domain reversals to an integer multiple of the coherence length Λc given by formula Λc=2π/{β(2ω)−2β(ω)}, wherein β(2ω) represents the propagation constant of the second harmonic and β(ω) represents the propagation constant of the fundamental wave, phase matching (artificial phase matching) between the fundamental wave and the second harmonic can be obtained.

Further there have been made attempts to efficiently obtain the phase matching in an optical wavelength conversion element, which has an optical waveguide formed of a nonlinear optical material and converts the wavelength of a fundamental wave guided along the optical waveguide, by forming the domain reversals described above. See, for instance, Japanese Unexamined Patent Publication No. 5(1993)-29207.

Such conventional optical wavelength conversion elements with periodic domain reversals are broadly classified into two types depending on the orientation of the spontaneous polarization of the substrate. In one type, as shown in FIG. 3, the orientation of the spontaneous polarization (shown by arrow P) of the substrate 2 is normal to the substrate surface 2a along which the optical waveguide 1 extends, and in the other type, as shown in FIG. 4, the orientation of the spontaneous polarization (shown by arrow P) of the substrate 2 is parallel to the substrate surface 2a along which the optical waveguide 1 extends.

The optical wavelength conversion element of the former type is disclosed, for instance, in Japanese Unexamined Patent Publication No. 5(1993)-29207 and is advantageous in that the domain reversals can be formed sufficiently deep into the substrate. However the optical wavelength conversion element of the former type is disadvantageous in that when it is used in combination with a semiconductor laser, the fundamental wave input optical system is complicated. This will be described in detail hereinbelow.

In the arrangement shown in FIG. 3, the beam pattern of the guided light is such that the beam diameter is small in the direction parallel to the orientation of the vector of polarization shown by arrow R in A in FIG. 3 and large in the direction normal thereto. Further the orientation of the vector of polarization is equal to the direction of spontaneous polarization of the substrate 2 (in ferroelectric material such as LiNbO$_3$, the direction of spontaneous polarization is generally parallel to Z-axis) and the waveguide mode is a TM mode. On the other hand, the beam pattern of a laser beam 4 emanating from a semiconductor laser 3 is such that the beam diameter is large in the direction parallel to the orientation of the vector of polarization shown by arrow Q in B in FIG. 3 and small in the direction normal thereto.

Accordingly when the directions of polarization are matched with each other in order to input the laser beam 4 emanating from the semiconductor laser 4 into the optical waveguide 1, the beam diameters are mismatched and the laser beam 4 cannot be efficiently input into the optical waveguide 1, which results in poor power of the second harmonic being obtained.

In order to rotate the direction of polarization of the laser beam 4 by 90° with the beam pattern of the laser beam 4 kept unchanged, a complicated fundamental wave input optical system comprising a λ/2 plate 7 disposed between a collimator lens 5 and a condenser lens 6 becomes necessary.

In contrast, in the case of the optical wavelength conversion element shown in FIG. 4, the direction of linear polarization of the laser beam 4 can be matched with the direction of Z-axis of the substrate 2 without a λ/2 plate and accordingly the fundamental wave input optical system may be simple in structure, whereby the semiconductor laser 3 can be directly coupled to an end face of the optical waveguide 1. The waveguide mode in this case is a TE mode.

However the optical wavelength conversion element shown in FIG. 4 is disadvantageous in that the domain reversals 8 cannot be formed sufficiently deep from the substrate surface 2a. This will be described in detail with reference to FIG. 19, hereinbelow.

In FIG. 19, D denotes an electrode for forming the domain reversals 8. The domain reversals 8 are arranged in the direction of the X-axis and the thickness of the substrate is parallel to the Y-axis. When the actual wavelength of the fundamental wave to be wavelength-converted is taken into account, the pitch of the domain reversals 8 indicated at a in FIG. 19 is in the order of several μm. Assuming that the pitch a of the domain reversals 8 is 5 μm for the purpose of simplicity, the width b of a domain reversal 8 should be 2.5 μm in order to set the ratio of the width of the domain reversal 8 to that of the non-reversed portions to 1:1 so that the wavelength conversion efficiency is maximized. At present it is difficult to produce an electrode D which is smaller than 0.5 μm in width c and accordingly when it is assumed that the electrode D is 0.5 μm in width c, domain reversals 8 which are 2.5 μm in width b can be obtained by causing the domain reversal 8 to grow by a distance d (=1 μm) in the direction in which the domain reversals 8 are arranged from each edge of the electrode D.

The growth rate of the domain reversed region is large in a direction parallel to the orientation of the spontaneous polarization and small in directions normal to the orientation of the spontaneous polarization (i.e., in the directions of X-axis and Y-axis). The growth rate in the directions of X-axis and Y-axis are equal to each other. Accordingly, when domain reversals 8 2.5 μm wide are produced in the manner described above, the depth (the dimension in the direction of Y-axis) of the domain reversals 8 becomes about 1 μm.

Thus in the optical wavelength conversion element of the type shown in FIG. 4, the depth of the domain reversals 8 is limited to about 1 μm which is smaller than the field distribution of the guided light, which results in a small overlap integral of the domain reversals 8 and the guided light and in poor wavelength conversion efficiency.

SUMMARY OF THE INVENTION

In view of the foregoing observations and description, the primary object of the present invention is to provide an optical wavelength conversion element in which domain reversals are formed sufficiently deep and at the same time, a high wavelength conversion efficiency can be obtained without necessity of a complicated fundamental wave input optical system, when a semiconductor laser is employed as a fundamental wave source.

Another object of the present invention is to provide a method of manufacturing such an optical wavelength conversion element.

Still another object of the present invention is to provide an optical wavelength conversion module which employs an optical wavelength conversion element described above and can generate a high-power wavelength-converted wave with a high wavelength conversion efficiency.

In accordance with a first aspect of the present invention, there is provided an optical wavelength conversion element comprising an optical waveguide which is formed on a ferroelectric crystal substrate having a nonlinear optical effect and extends along one surface of the substrate, and domain reversals which are periodically formed in the optical waveguide and arranged in a direction, the orientation of the spontaneous polarization of the substrate being reversed in the domain reversals and the optical wavelength conversion element converting the wavelength of a fundamental wave travelling in the direction in which the domain reversals are arranged under the guidance of the optical waveguide, wherein the improvement comprises that the orientation of the spontaneous polarization of the substrate is at an angle θ larger than 0° and smaller than 90° to said one surface of the substrate in a plane normal to the direction in which the fundamental wave is guided.

When the optical waveguide is formed by proton exchange, it is preferred that said angle θ is smaller than 70° and when the optical waveguide is formed by proton exchange and annealing, it is preferred that said angle θ be smaller than 20°.

Preferably the angle θ should be larger than 0.2° and more preferably should be larger than 0.5°.

As the ferroelectric crystal substrate, a substrate of $LiNb_xTa_{1-x}O_3$ (0≦x≦1) without doping, $LiNbO_3$ doped with MgO or the like, are preferred, as well as a substrate of $LiNb_xTa_{1-x}O_3$ doped with Zn, $LiNb_xTa_{1-x}O_3$ doped with Sc and MgO, $KTiOP_4$, $KNbO_3$ or the like. A substrate of $LiNbO_3$ doped with MgO is resistant to optical damage and is preferable to a substrate of $LiNb_xTa_{1-x}O_3$ without doping.

In accordance with a second aspect of the present invention, there is provided a method of manufacturing the optical wavelength conversion element comprising the steps of forming a substrate by cutting a single domain ferroelectric crystal having a nonlinear optical effect along a plane at an angle θ larger than 0° and smaller than 90° to the orientation of spontaneous polarization of the ferroelectric crystal, forming periodic domain reversals on the substrate by applying an electric field in a predetermined pattern to the substrate from outside the substrate, and forming on the substrate an optical waveguide which includes the domain reversals and extends along a surface of the substrate parallel to the cut surface.

It is preferred that said electric field be applied through electrodes in a predetermined pattern mounted on the substrate.

It is further preferred that an electric voltage is directly applied to the substrate through the electrodes.

The electric field may also be applied by a corona charging method or an electron ray irradiation method.

In accordance with a third aspect of the present invention, there is provided an optical wavelength conversion module comprising an optical wavelength conversion element described above and a semiconductor laser for inputting a laser beam as a fundamental wave into the optical waveguide of the optical wavelength conversion element so that the laser beam is guided in a TE mode through the optical waveguide of the optical wavelength conversion element.

In the optical wavelength conversion element of the present invention, the orientation of the spontaneous polarization of the substrate 2, i.e., the direction of Z-axis, is not normal to the substrate surface 2a as shown in FIG. 1, and accordingly even if the laser beam 4 emanating from the semiconductor laser 3 enters the optical waveguide 1 with its direction of linear polarization (the direction of arrow Q) in parallel to the substrate surface 2a, wavelength conversion can be realized by use of nonlinear optical constant $d_{33}$. In this case, the orientation of the electric-field vector of the laser beam 4 is parallel to the substrate surface 2a and the laser beam 4 is guided in a TE mode through the optical waveguide 1. At this time, the effective nonlinear optical constant is $d_{33}\cos\theta$. In FIG. 1, the elements analogous to those described above in conjunction with FIGS. 3 and 4 are given the same reference numerals.

When the laser beam 4 enters the optical waveguide 1 with its direction of linear polarization in parallel to the substrate surface 2a, the aforesaid λ/2 plate for rotating the direction of linear polarization becomes unnecessary and the optical system for inputting the fundamental wave can be simple in structure, which makes it feasible to directly couple the semiconductor laser 3 to an end face of the optical waveguide 1. Further when the laser beam 4 enters the optical waveguide 1 in this manner, the efficiency in inputting the laser beam 4 into the optical waveguide 1 becomes high.

Further when the orientation of the spontaneous polarization of the substrate 2, that is, the direction of Z-axis, is at an angle θ to the substrate surface 2a, the depth d of the domain reversals 8 is basically equal to Ltanθ as shown in FIG. 4. However when expansion of the domain reversals, 1 μm, described above in conjunction with FIG. 19 is taken into account, the depth d of the domain reversals 8 is as represented by the following formula (1).

$$d = L\tan\theta + 1 \ \mu m \quad (1)$$

The value of L is not determined solely depending upon the size of the means for applying an electric field for reversing the domain (in FIG. 2 a comb-shaped electrode 10 and a planar electrode are shown by way of example) but tends to be increased with an increase in the value of the angle θ. In the conventional element shown in FIG. 4, the domain reversals 8 are formed with the angle θ of 0° and accordingly L is minimized. In the conventional element shown in FIG.

3, the domain reversals 8 are formed with the angle θ of 90° and accordingly L is maximized, that is, the domain is reversed over the entire area opposed to the electrodes for applying the electric field.

Thus by increasing the angle θ to some extent, the depth d of the domain reversals 8 can be sufficiently large. When the depth d of the domain reversals 8 is sufficiently large, the overlap integral of the domain reversals 8 and the guided light can be increased, which results in a high wavelength conversion efficiency.

In the wavelength conversion module of the present invention, a semiconductor laser is coupled to the optical wavelength conversion element so that the laser beam is guided in a TE mode through the optical waveguide of the optical wavelength conversion element. Accordingly the efficiency in inputting the laser beam into the optical waveguide becomes high, the optical system for inputting the fundamental wave may be simple in structure and a high wavelength conversion efficiency can be obtained as described above.

It has been said that a light beam is guided in a TE single mode through a proton exchange optical waveguide when the angle φ between Z-axis and the substrate surface is between 0° and 70° (0°<φ<70°). For example, see "Journal of Optical Communications", 5(1984)1, pp. 16 to 19. In the present invention, the angle θ corresponds to the angle φ, and accordingly when the optical waveguide is formed by proton exchange, it is preferred that the angle θ be smaller than 70° in improving the wavelength conversion efficiency.

Further it has been known that a light beam is guided in a TE single mode through an optical waveguide formed by proton exchange and subsequent annealing when the angle φ between Z-axis and the substrate surface is between 0° and 20° (0°<φ<20°). Accordingly when the optical waveguide is formed by proton exchange and subsequent annealing, it is preferred that the angle θ be smaller than 20° in improving the wavelength conversion efficiency.

Further it has been found that when a domain reversal structure having an optimal duty ratio to maximize the wavelength conversion efficiency (where the ratio of the width of the domain reversals to that of the non-reversed portions is 1:1) is formed, the dimension L shown in FIG. 2 becomes about 50 μm so long as the angle θ is within several degrees. Generally the field distribution of the waveguide mode can be as thin as 1.2 μm. Accordingly, when the angle θ is set to 0.2°, the depth d of the domain reversals becomes 1.2 μm as can be seen from formula (1), i.e., becomes substantially equal to the field distribution of the waveguide mode. That is, when θ>0.2, the domain reversals can never be smaller than the field distribution of the waveguide mode and the wavelength conversion efficiency becomes high.

Though the field distribution of the waveguide mode can be as thin as 1.2 μm, external light can enter the optical waveguide more stably as the field distribution increases. Actually external light can stably enter the optical waveguide when the field distribution of the waveguide mode is larger than 1.4 μm. According to formula (1), the depth d of the domain reversals becomes 1.4 μm when the angle θ is 0.5°. Therefore when θ>0.5, the fundamental wave can stably enter the optical waveguide and at the same time, the domain reversals sufficiently overlap the field distribution of the waveguide mode, whereby the wavelength conversion can be effected efficiently.

DESCRIPTION OF THE PREFERRED EMBODIMENTS

Figure 5:
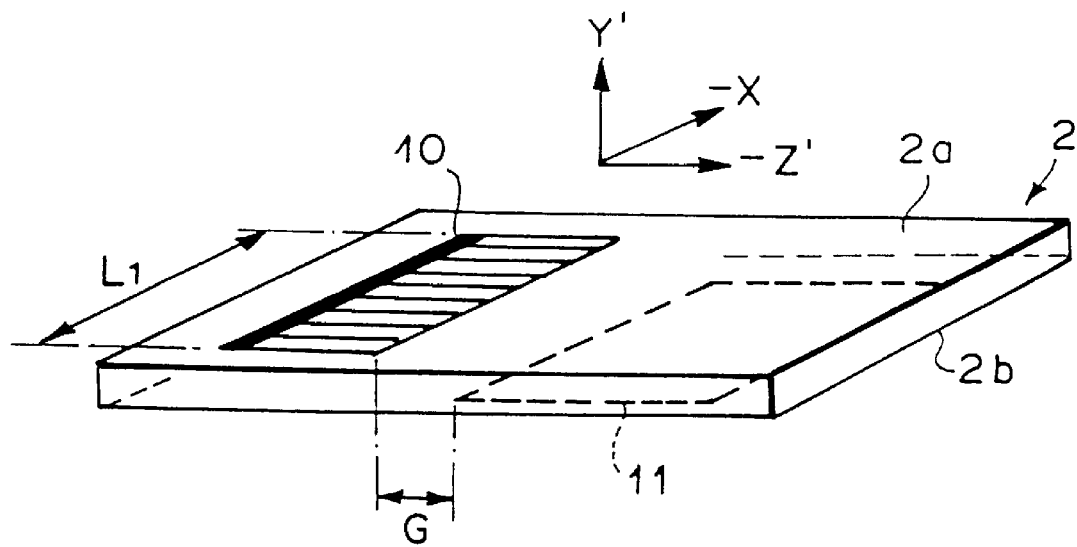
FIG. 5 is a schematic perspective view for illustrating the manner of forming the optical wavelength conversion element in accordance with the first embodiment of the present invention.
Figure 6:
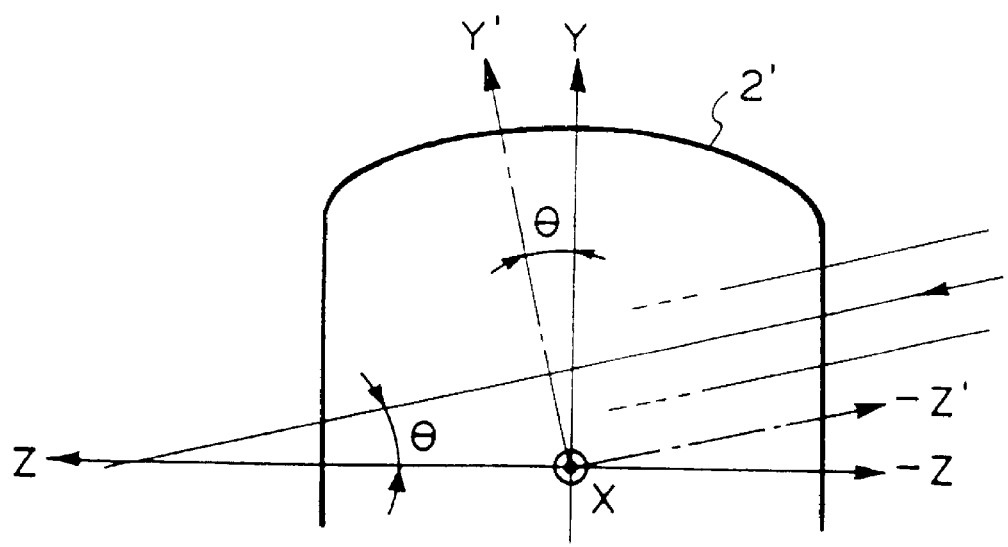
FIG. 6 is a schematic view for illustrating the manner of slicing the substrate used in the optical wavelength conversion element shown in FIG. 5.

An optical wavelength conversion element in accordance with an embodiment of the present invention was formed. In FIG. 5, reference numeral 2 denotes a substrate of LiNbO$_3$ doped with 5 mol % MgO, which is a ferroelectric material having a nonlinear optical effect. This ferroelectric material will be referred to as "MgO-LN", hereinbelow. The MgO-LN substrate 2 was formed by slicing a MgO-LN ingot 2' along planes at an angle of 3° (θ=3°) to Z-axis as shown in FIG. 6 and polishing the same. The accuracy in the polishing angle θ(=3°) was within ±0.1°. The MgO-LN substrate was single domain ferroelectric crystal and was, for instance, 0.3 mm in thickness.

The direction which is parallel to the surfaces 2a and 2b of the MgO-LN substrate 2 thus obtained and normal to X-axis is at the angle θ(=3°) to the Z-axis and the direction which is normal to the substrate surfaces 2a and 2b is at the angle θ(=3°) to the Y-axis. These directions will be respectively referred to as "Z'-direction" and "Y'-direction", hereinbelow, for the purpose of convenience in description.

Figure 7:
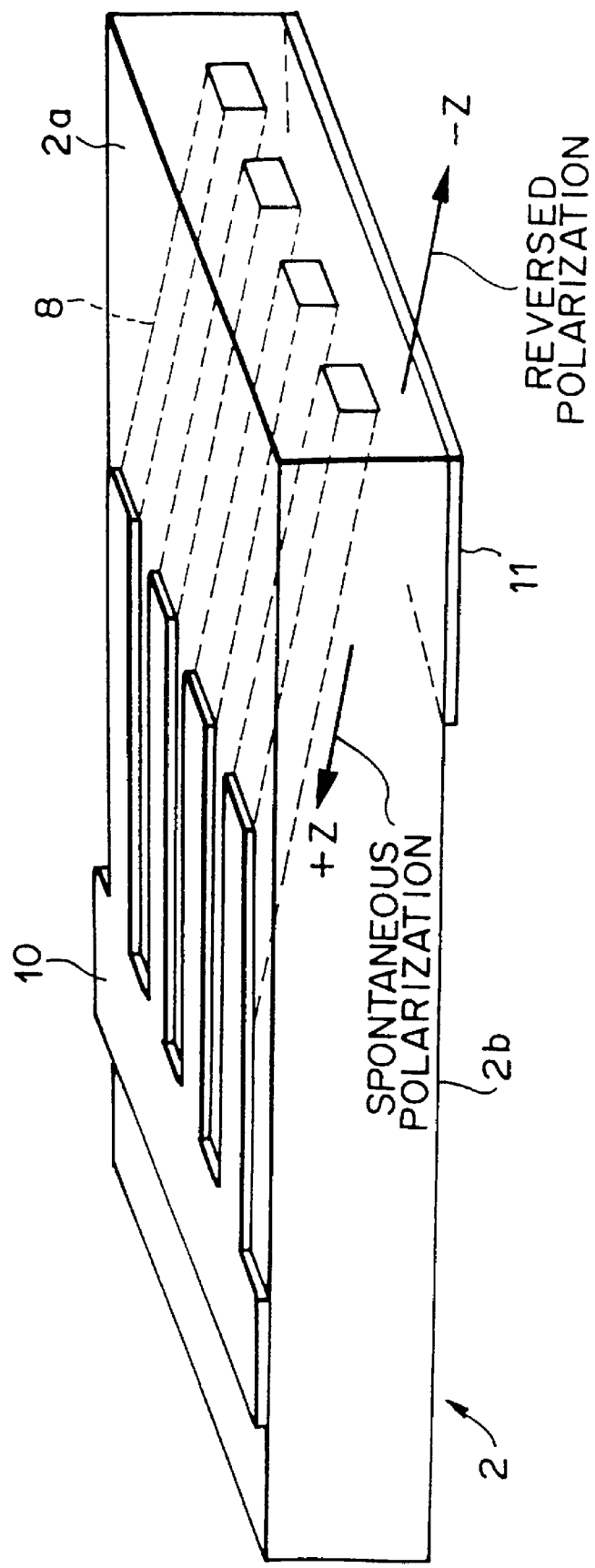
FIG. 7 is a schematic perspective view showing the domain reversals formed in the optical wavelength conversion element shown in FIG. 5.

A comb-shaped electrode 10 and a planar electrode 11 were mounted respectively on the upper and lower substrate surfaces 2a and 2b and pulse voltages were applied between the electrodes 10 and 11 so that the comb-shaped electrode 10 on the +Z side was at a positive potential and the planar electrode 11 on the –Z side was at a negative potential. This causes the orientation of spontaneous polarization of the substrate 2, which has been directed to +Z direction, to be reversed in the portion applied with the voltage as shown in FIG. 7, whereby domain reversals 8 are formed. Since the orientation of spontaneous polarization is inclined at θ(=3°) to the substrate surface 2a, the orientation of polarization of the domain reversals 8 is also inclined at θ(=3°) to the substrate surface 2a.

Though, in this embodiment, the electrodes 10 and 11 were formed of Cr, they may be formed of any material so long as it is sufficiently lower than the MgO-LN substrate 2 in electric resistance. The electrodes 10 and 11 may be formed by known photolithography. They may be, for instance, 20 to 100 μm in thickness and 6 mm in length L1. The gap G between the electrodes 10 and 11 may be 100 to 500 μm, for instance. The pitch Λ of the fingers of the comb-shaped electrode 10 was 4.75 μm, and the fingers were 1000 μm in length and 0.5 μm in width. The width of the planar electrode 11, i.e., the dimension in the Z'-direction, was 100 μm.

Application of the electric voltage was carried out under vacuum, for instance, not higher than 5×10$^{-5}$ torr. in order to prevent a leak of electric current. Otherwise application of the electric voltage may be carried out in electrical insulating oil. The pulse width of the electric voltage may be 1 to 10 seconds.

Each of the domain reversals 8 spreads wider in the direction normal to the Z-axis as the electric voltage applied increases. As is well known, the wavelength conversion efficiency is maximized when the ratio of the length (measured in the direction in which light is guided through the waveguide) of the domain reversals 8 to that of the non-reversed portions is 1:1. The ratio becomes 1:1 when the electric voltage applied is about 4000V in the case the gap G is 200 μm and when the electric voltage applied is about 3500V in the case the gap G is 400 μm. The values of the voltage are for the substrate at a room temperature, and when the temperature of the substrate is, for instance, 200° C., the electric voltages may be about one third of the value described above.

The MgO-LN substrate 2 thus formed with the domain reversals 8 was cut along a plane normal to the Z'-direction and the cut surface was subjected to selective etching for 20 minutes by use of etching liquid of a 1:2 mixture of HF and HNO$_3$ after optical polishing. By the selective etching, the domain reversals 8 and the non-reversed portions are etched to different extents due to difference in chemical properties, and the state of the domain reversals 8 can be observed through a microscope.

Figure 4:
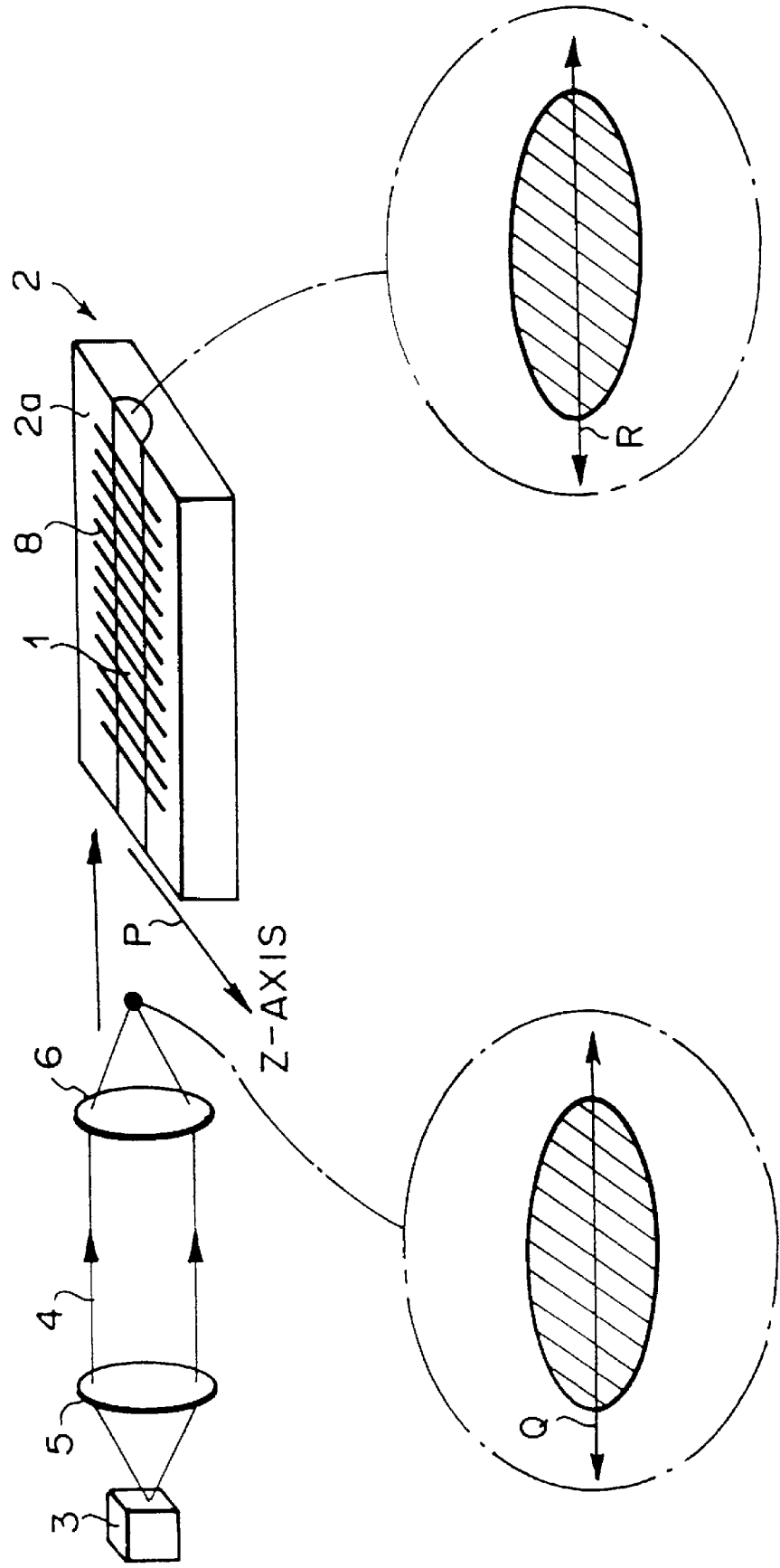
FIG. 4 is a schematic view showing another example of the conventional optical wavelength conversion element.
Figure 17:
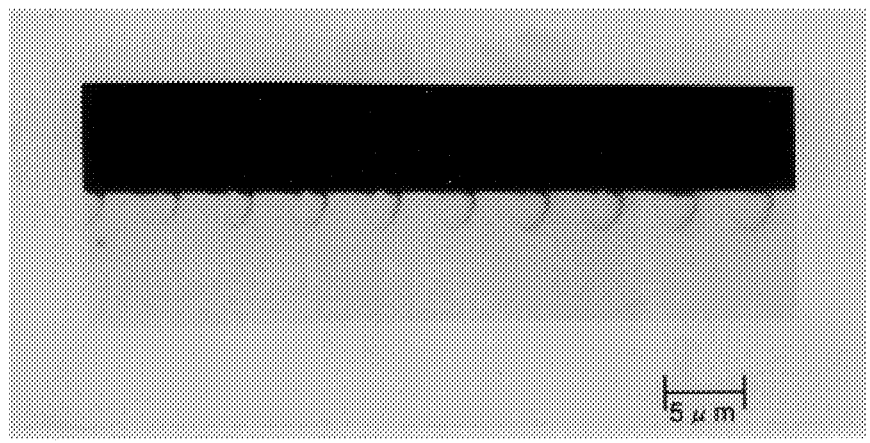
FIG. 17 is a microphotograph of the pattern of the domain reversals formed on the substrate of the optical wavelength conversion element in accordance with the present invention.
Figure 18:
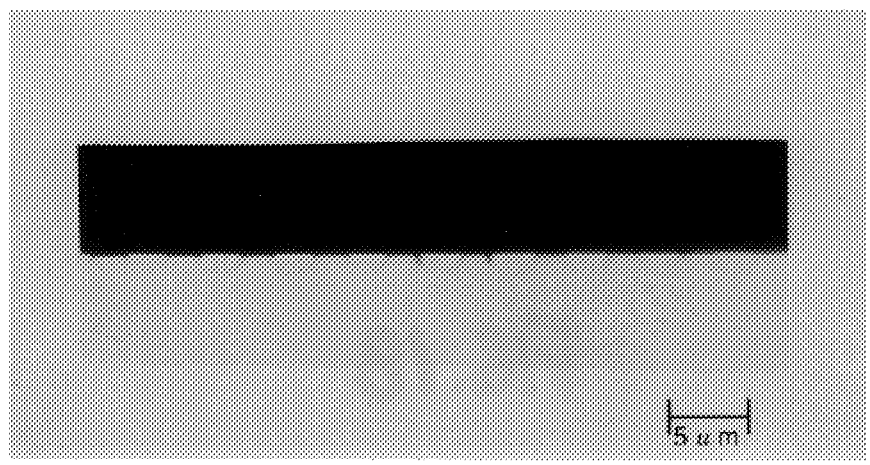
FIG. 18 is a microphotograph of the pattern of the domain reversals formed on the substrate of a conventional optical wavelength conversion element.
Figure 19:
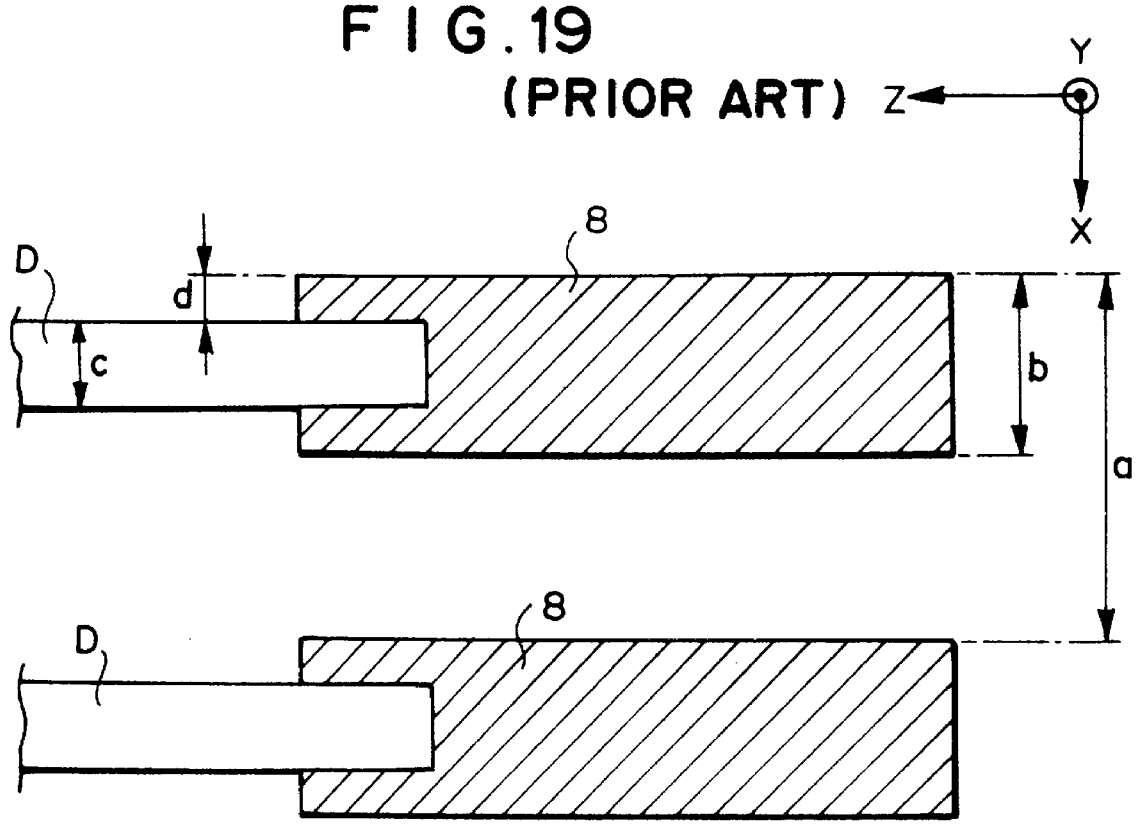
FIG. 19 is a view for illustrating the problem inherent to the conventional optical wavelength conversion element.

FIG. 17 is a microphotograph of the cut surface and FIG. 18 is a microphotograph of a similar cut surface of the conventional optical wavelength conversion element shown in FIG. 4 (having a MgO-LN substrate). The microphotographs are at ×2000 magnification. As can be seen from the comparison of the microphotographs, the domain reversals are deeper in the MgO-LN substrate 2 formed with the domain reversals 8 in the manner described above.

That is, the depth of the domain reversals 8 formed in the manner described above is 2 to 3 μm, which is 2 to 3 times as deep as that (about 1 μm) of the conventional optical wavelength conversion element shown in FIG. 4.

Then an optical channel waveguide was formed in the MgO-LN substrate 2 in the following manner. A metal (Ta in this particular embodiment) mask 5 μm to 9 μm wide in Z'-direction was formed by known photolithography in the vicinity of the front end of the comb-shaped electrode 10, where the domain reversal was the deepest. Then the substrate 2 was subjected to proton exchange in pyrophosphoric acid at 160° C. for 64 minutes. The Ta mask was removed by use of an etching solution and the substrate 2 was subjected to an annealing treatment at 350° C. for one hour in the atmosphere. Thus an optical channel waveguide 1 extending in the direction of arrangement of the domain reversals 8 was formed.

Thereafter the –X face and +X face of the MgO-LN substrate 2 including the end faces of the optical channel waveguide 1 were subjected to optical polishing, whereby an optical wavelength conversion element 20 was obtained. Then the optical wavelength conversion element 20, a semiconductor laser 3 as a fundamental wave source and a fundamental wave inputting optical system comprising a collimator lens 5 and a condenser lens 6 were assembled into an optical wavelength conversion module shown in FIG. 1. A semiconductor laser emitting an wavelength of 950 nm or so was employed as the semiconductor laser 3 and the laser beam 4 emitted from the semiconductor laser 3 was caused to enter the optical wavelength conversion element 20, thereby generating a second harmonic whose wavelength was one half of the laser beam 4.

Due to the domain reversal structure where the domain reversals 8 are periodically arranged in the direction of travel of the fundamental wave (laser beam 4), the laser beam 4 and the second harmonic are matched with each other in phase (so-called artificial phase matching). In this particular embodiment, a band pass filter 9 was disposed between the collimator lens 5 and the condenser lens 6 in order to lock the longitudinal mode of the semiconductor laser 3.

In the optical wavelength conversion module, since the orientation of the spontaneous polarization of the substrate 2, i.e., the direction of Z-axis, is not normal to the substrate surface 2a, even if the laser beam 4 emanating from the semiconductor laser 3 enters the optical waveguide 1 with its direction of linear polarization (the direction of arrow Q) in parallel to the substrate surface 2a, wavelength conversion can be realized by use of nonlinear optical constant $d_{33}$. In this case, since the beam pattern of the laser beam emanating from the semiconductor laser 3 is matched with that of the laser beam travelling through the optical waveguide 1, the laser beam emanating from the semiconductor laser 3 can be input into the optical waveguide 1 at a high efficiency, whereby intensity of the second harmonic generated can be high. The laser beam 4 is guided in a TE mode through the optical waveguide 1, and the effective nonlinear optical constant at this time is $d_{33}\cos\theta$.

The conversion efficiency of wavelength conversion in this case is 180%/Wcm$^2$, which is greatly higher than that, 55%/Wcm$^2$, obtained in a conventional optical wavelength conversion element formed by forming an optical waveguide and a periodic domain reversal structure on a X- or Y-cut LiTaO$_3$ substrate described, for instance, in "Technical Digest Of The Fourth Microoptics Conference And The Eleventh Topical Meeting On Gradient-index Optical Systems" (page 154).

Figure 8:
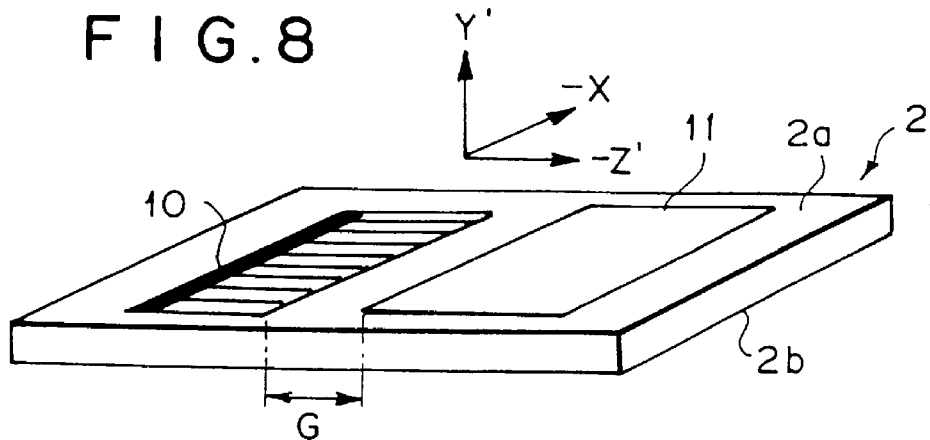
FIG. 8 is a schematic perspective view for illustrating the manner of forming the optical wavelength conversion element in accordance with a second embodiment of the present invention.

A second embodiment of the present invention will be described with reference to FIG. 8, hereinbelow. In FIG. 8, elements analogous to those shown in FIG. 5 are given the same reference numerals and will not be described here.

The second embodiment differs from the first embodiment only in that both the comb-shaped electrode 10 and the planar electrode 11 are mounted on the same electrode surface 2a. Pulse voltages were applied between the electrodes 10 and 11 in the same manner as the first embodiment. The shapes of the electrodes 10 and 11, the gap G therebetween and the like were the same as those in the first embodiment.

However in this embodiment, the ratio of the domain reversals 8 to that of the non-reversed portions becomes 1:1 when the electric voltage applied is about 1500V in the case the gap G is 200 µm and when the electric voltage applied is about 3000V in the case the gap G is 400 µm. The values of the voltage are for the substrate at a room temperature, and when the temperature of the substrate is, for instance, 200° C., the electric voltages may be about one third of the value described above.

Also in this embodiment, the depth of the domain reversals 8 formed was 2 to 3 µm, which was 2 to 3 times as deep as that (about 1 µm) of the conventional optical wavelength conversion element shown in FIG. 4.

Then an optical channel waveguide was formed in the MgO-LN substrate 2 in the same manner as in the first embodiment and −X face and +X face of the MgO-LN substrate 2 including the end faces of the optical channel waveguide 1 were subjected to optical polishing, whereby an optical wavelength conversion element 20 was obtained. When the optical wavelength conversion element 20 thus obtained was employed to generate a second harmonic in the manner described above in conjunction with FIG. 1, the conversion efficiency of wavelength conversion was 180%/Wcm$^2$, which was sufficiently high.

Figure 9:
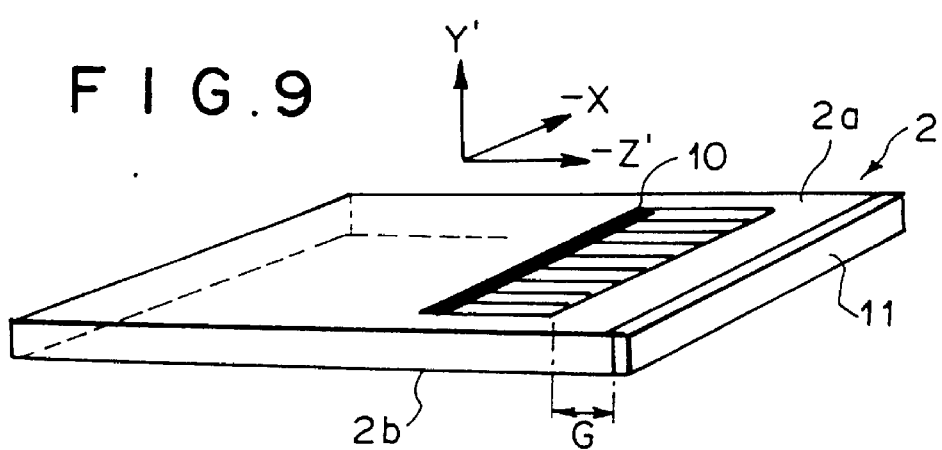
FIG. 9 is a schematic perspective view for illustrating the manner of forming the optical wavelength conversion element in accordance with a third embodiment of the present invention.

A third embodiment of the present invention will be described with reference to FIG. 9, hereinbelow.

The third embodiment differs from the first embodiment only in that the planar electrode 11 is mounted on one end face between the electrode surfaces 2a and 2b. Pulse voltages were applied between the electrodes 10 and 11 in the same manner as the first embodiment. The shapes of the electrodes 10 and 11, the gap G therebetween and the like were the same as those in the first embodiment.

In this embodiment, the ratio of the domain reversals 8 to that of the non-reversed portions becomes 1:1 when the electric voltage applied is about 1500V in the case the gap G is 200 µm and when the electric voltage applied is about 3000V in the case the gap G is 400 µm. The values of the voltage are for the substrate at a room temperature, and when the temperature of the substrate is, for instance, 200° C., the electric voltages may be about one third of the value described above.

Also in this embodiment, the depth of the domain reversals 8 formed was 2 to 3 µm, which was 2 to 3 times as deep as that (about 1 µm) of the conventional optical wavelength conversion element shown in FIG. 4.

Then an optical channel waveguide was formed in the MgO-LN substrate 2 in the same manner as in the first embodiment and −X face and +X face of the MgO-LN substrate 2 including the end faces of the optical channel waveguide 1 were subjected to optical polishing, whereby an optical wavelength conversion element 20 was obtained. When the optical wavelength conversion element 20 thus obtained was employed to generate a second harmonic in the manner described above in conjunction with FIG. 1, the conversion efficiency of wavelength conversion was 180%/Wcm$^2$, which was sufficiently high.

Figure 10:
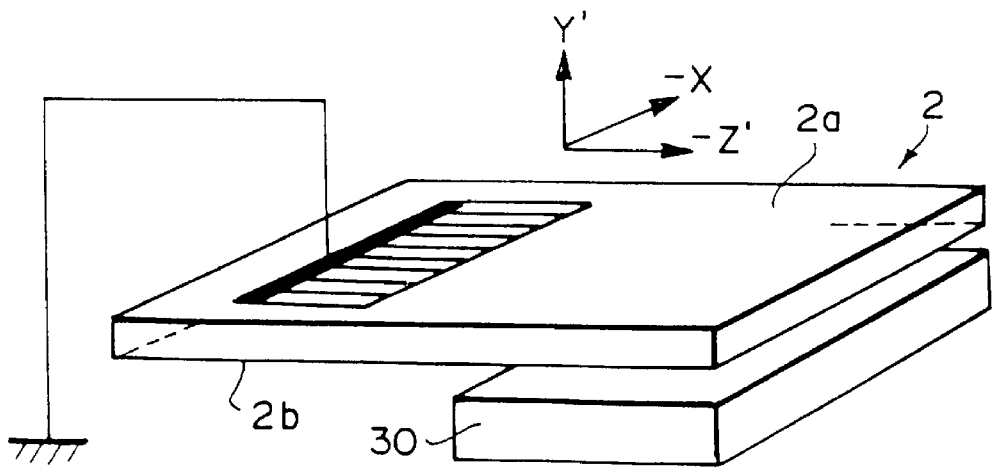
FIG. 10 is a schematic perspective view for illustrating the manner of forming the optical wavelength conversion element in accordance with a fourth embodiment of the present invention.

A fourth embodiment of the present invention will be described with reference to FIG. 10, hereinbelow.

The fourth embodiment differs from the first embodiment in the manner of applying an electric field to the MgO-LN substrate 2. That is, in this embodiment, the electric field is applied by corona charging. For this purpose, a comb-shaped electrode 10 the same as that used in the first embodiment was mounted on the substrate surface 2a and was grounded. Further a corona head 30 was opposed to the other substrate surface 2b, and an electric voltage was applied between the electrode 10 and the corona head 30 so that the comb-shaped electrode 10 was at a positive potential and the corona head 30 was at a negative potential, thereby applying an electric field by corona charging.

This causes the orientation of spontaneous polarization of the substrate 2, which has been directed to +Z direction, to be reversed in the portion applied with the voltage, whereby domain reversals 8 the same as those shown in FIG. 7 are formed. Since the orientation of spontaneous polarization is inclined at $\theta(=3°)$ to the substrate surface 2a also in this case, the orientation of polarization of the domain reversals 8 is also inclined at $\theta(=3°)$ to the substrate surface 2a.

Application of the electric field by corona charging was carried out with the comb-shaped electrode 10 disposed in vacuum and the corona head 30 disposed in the atmosphere in order to prevent leak of electric current. Otherwise the comb-shaped electrode may be disposed in electrical insulating oil. It is preferred that the electric field be applied in a pulse like fashion with the pulse width set to 1 to 10 seconds.

The domain reversals 8 thus formed were observed through a microscope. Also in this embodiment, the depth of the domain reversals 8 formed was 2 to 3 times as deep as that (about 1 µm) of the conventional optical wavelength conversion element shown in FIG. 4.

Then an optical channel waveguide was formed in the MgO-LN substrate 2 in the same manner as in the first embodiment and −X face and +X face of the MgO-LN substrate 2 including the end faces of the optical channel waveguide 1 were subjected to optical polishing, whereby an optical wavelength conversion element 20 was obtained. When the optical wavelength conversion element 20 thus obtained was employed to generate a second harmonic in the manner described above in conjunction with FIG. 1, the conversion efficiency of wavelength conversion was 180%/Wcm$^2$, which was sufficiently high.

Figure 11:
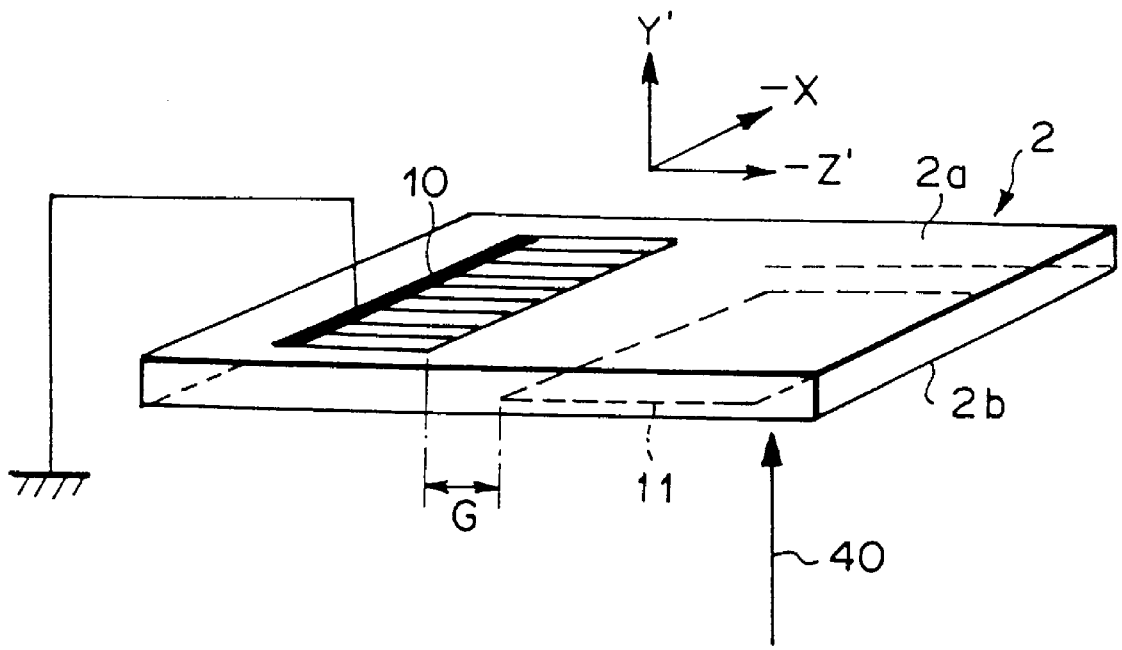
FIG. 11 is a schematic perspective view for illustrating the manner of forming the optical wavelength conversion element in accordance with a fifth embodiment of the present invention.

A fifth embodiment of the present invention will be described with reference to FIG. 11, hereinbelow.

The fifth embodiment differs from the preceding embodiments in the manner of applying an electric field to the MgO-LN substrate 2. That is, in this embodiment, a comb-shaped electrode 10 and a planar electrode 11 which were the same as those shown in FIG. 5 were respectively mounted on the substrate surfaces 2a and 2b. The comb-shaped electrode 10 was grounded and electron rays 40 were irradiated onto the planar electrode 11 in a pulse like fashion, whereby an electric field was applied so that the comb-shaped electrode 10 on the +Z side was at a positive potential and the planar electrode 11 on −Z side was at a negative potential.

This causes the orientation of spontaneous polarization of the substrate 2, which has been directed to +Z direction, to be reversed in the portion applied with the voltage, whereby domain reversals 8 the same as those shown in FIG. 7 are formed. Since the orientation of spontaneous polarization is inclined at θ(=3°) to the substrate surface 2a also in this case, the orientation of polarization of the domain reversals 8 is also inclined at θ(=3°) to the substrate surface 2a.

Irradiation of electron rays 40 was carried out under vacuum, for instance, not higher than $5\times10^{-5}$ torr. in order to prevent a leak of electric current. The pulse width of the electron rays may be 1 to 10 seconds.

When the domain reversals 8 are formed in this manner, the ratio of the domain reversals 8 to that of the non-reversed portions becomes 1:1 when the electric voltage applied is about 4000V in the case the gap G between the electrodes 10 and 11 is 200 μm and when the electric voltage applied is about 3500V in the case the gap G is 400 μm. The values of the voltage are for the substrate at a room temperature, and when the temperature of the substrate is, for instance, 200° C., the electric voltages may be about one third of the value described above.

The domain reversals 8 thus formed were observed through a microscope. Also in this embodiment, the depth of the domain reversals 8 formed was 2 to 3 times as deep as that (about 1 μm) of the conventional optical wavelength conversion element shown in FIG. 4.

Then an optical channel waveguide was formed in the MgO-LN substrate 2 in the same manner as in the first embodiment and −X face and +X face of the MgO-LN substrate 2 including the end faces of the optical channel waveguide 1 were subjected to optical polishing, whereby an optical wavelength conversion element 20 was obtained. When the optical wavelength conversion element 20 thus obtained was employed to generate a second harmonic in the manner described above in conjunction with FIG. 1, the conversion efficiency of wavelength conversion was 180%/Wcm², which was sufficiently high.

Figure 12:
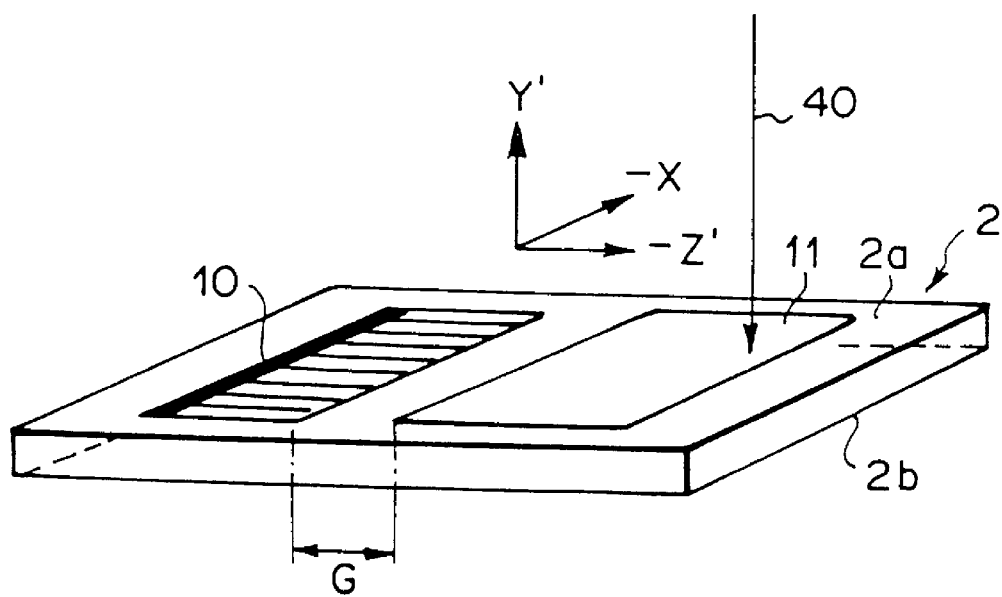
FIG. 12 is a schematic perspective view for illustrating the manner of forming the optical wavelength conversion element in accordance with a sixth embodiment of the present invention.

A sixth embodiment of the present invention will be described with reference to FIG. 12, hereinbelow.

The sixth embodiment differs from the fifth embodiment in the position of the planar electrode 11. That is, in this embodiment, the planar electrode 11 is mounted on the surface 2a of the MgO-LN substrate 2 together with the comb-shaped electrode 10 and electron rays 40 are irradiated onto the planar electrode 11 to form the domain reversals 8.

Figure 13:
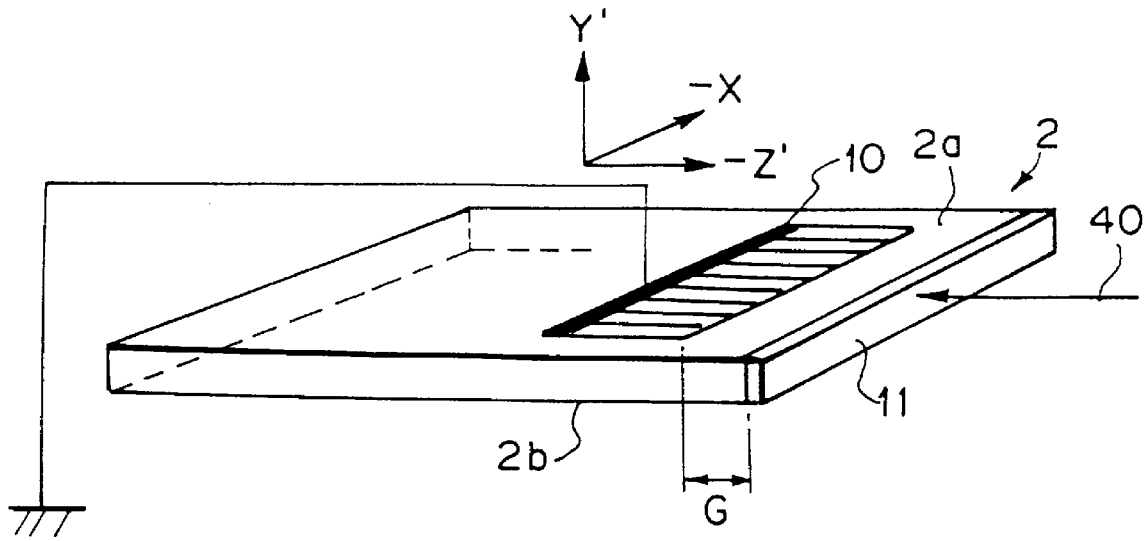
FIG. 13 is a schematic perspective view for illustrating the manner of forming the optical wavelength conversion element in accordance with a seventh embodiment of the present invention.

A seventh embodiment of the present invention will be described with reference to FIG. 13, hereinbelow.

The seventh embodiment differs from the fifth embodiment in the position of the planar electrode 11. That is, in this embodiment, the planar electrode 11 is mounted on an end face of the MgO-LN substrate 2 between the surfaces 2a and 2b and electron rays 40 are irradiated onto the planar electrode 11 to form the domain reversals 8.

Figure 14:
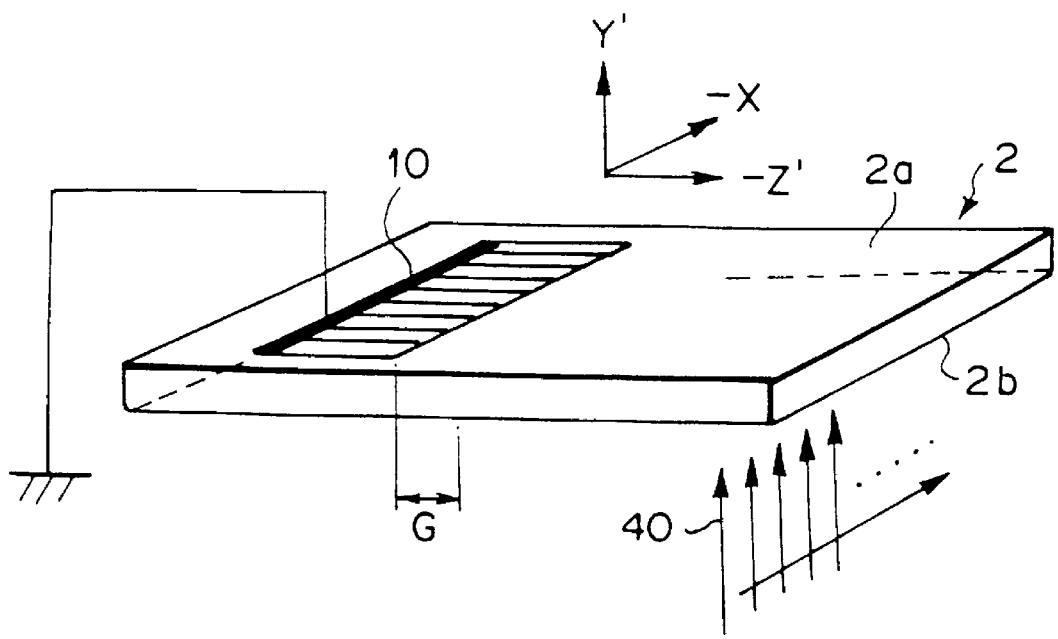
FIG. 14 is a schematic perspective view for illustrating the manner of forming the optical wavelength conversion element in accordance with an eighth embodiment of the present invention.

An eighth embodiment of the present invention will be described with reference to FIG. 14, hereinbelow.

The eighth embodiment differs from the fifth to seventh embodiments in that the planar electrode 11 is not provided and electron rays 40 are irradiated onto the surface 2b of the MgO-LN substrate 2 to two-dimensionally scan the surface 2b to form the domain reversals 8.

Figure 1:
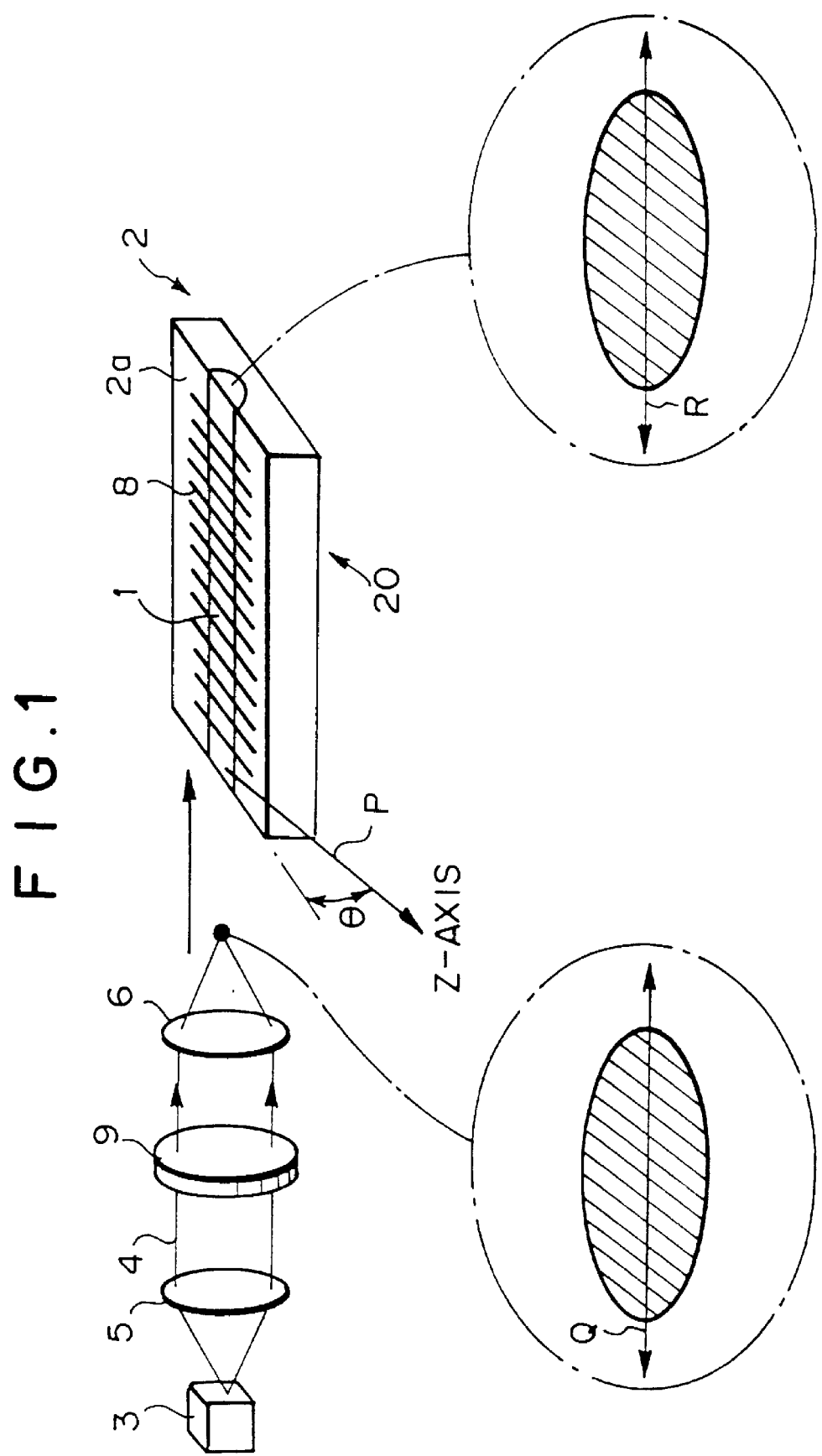
FIG. 1 is a schematic view showing an optical wavelength conversion element in accordance with a first embodiment of the present invention.
Figure 2:
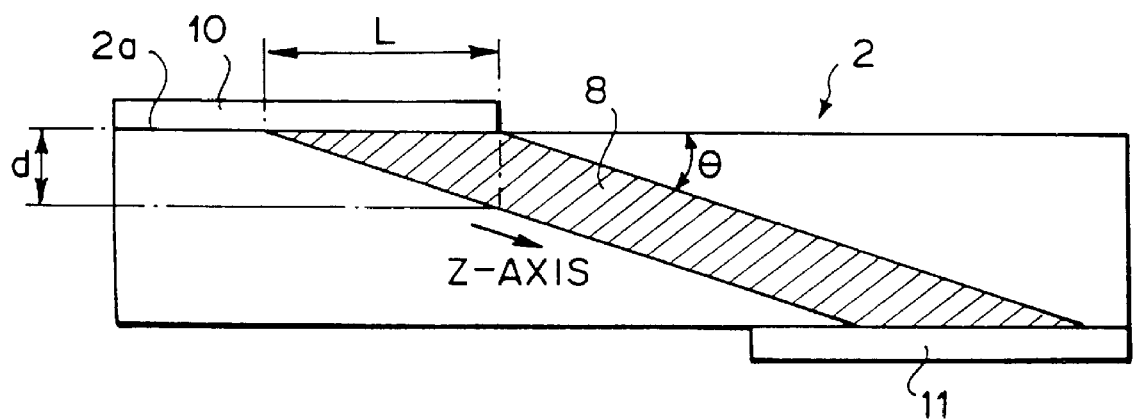
FIG. 2 is a view for illustrating the orientation of polarization of the substrate in the optical wavelength conversion element in accordance with the present invention.
Figure 3:
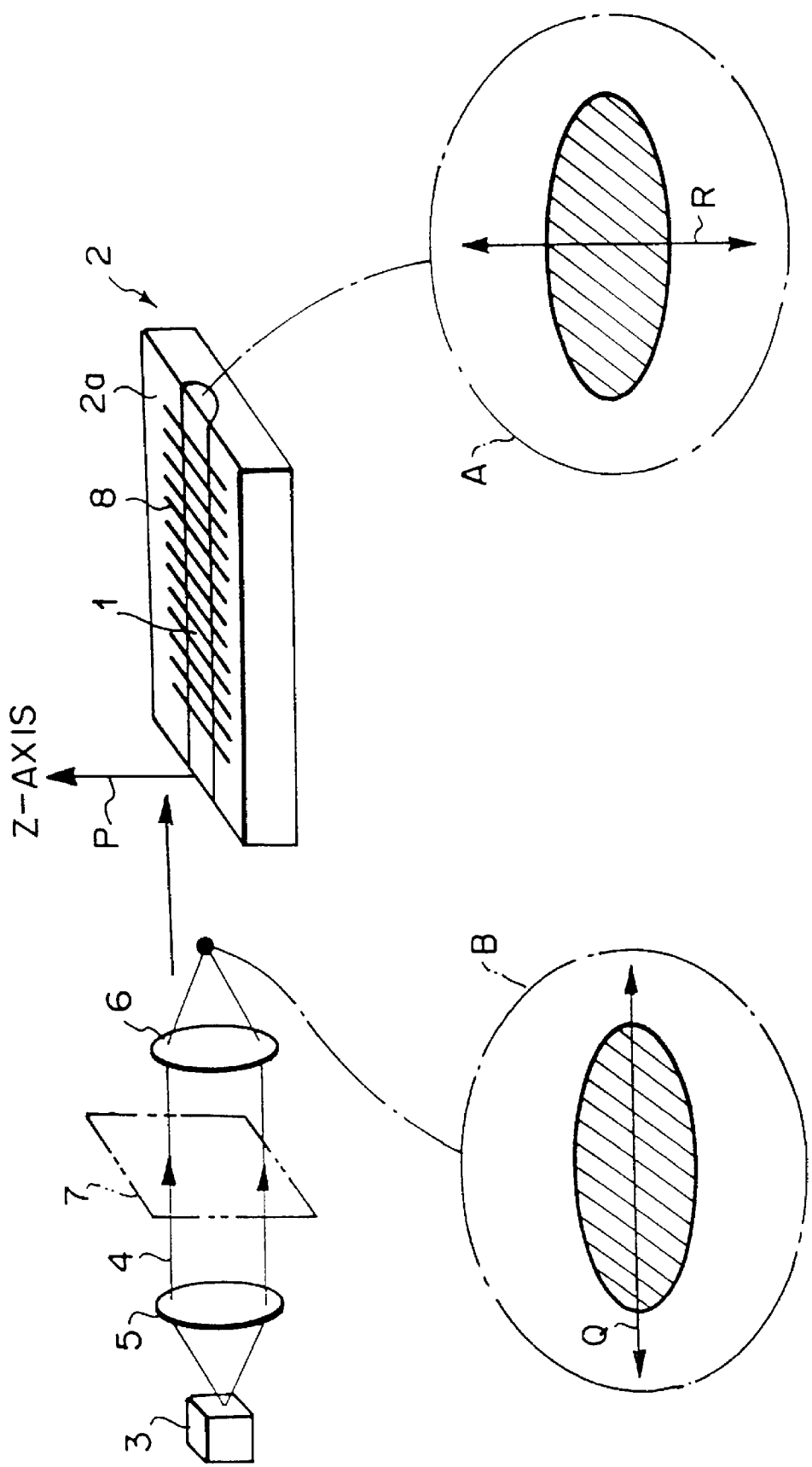
FIG. 3 is a schematic view showing an example of the conventional optical wavelength conversion element.
Figure 15:
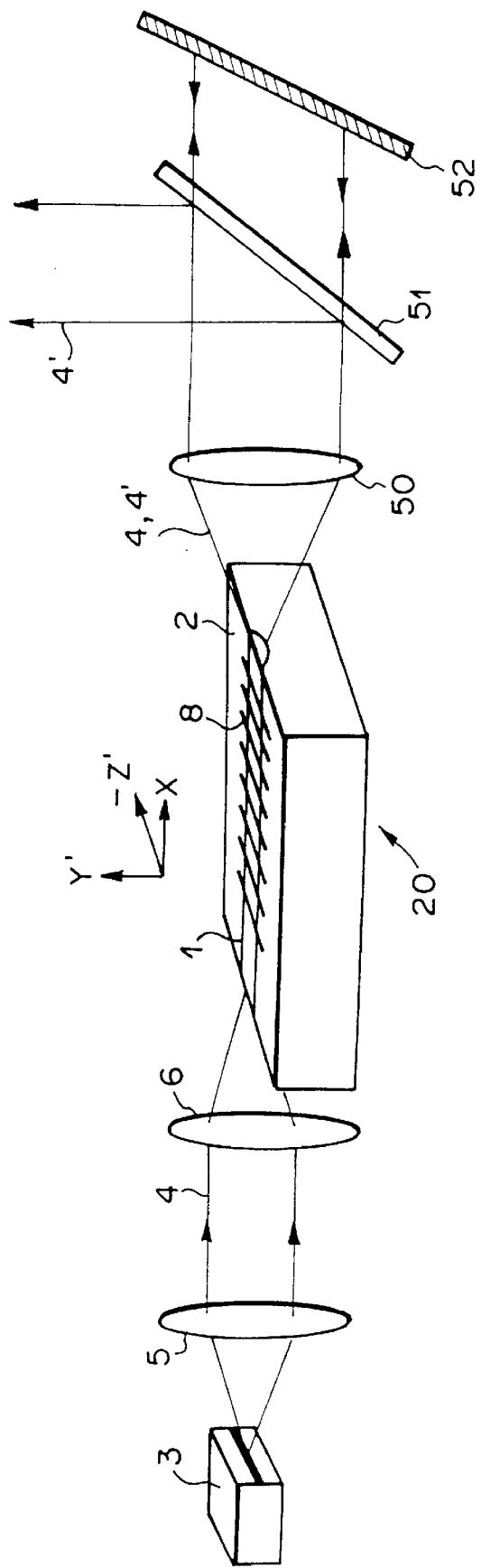
FIG. 15 is a schematic side view showing an example of an optical wavelength conversion module in accordance with the present invention.

Though the longitudinal mode of the semiconductor laser 3 is locked by the band pass filter 9 in the wavelength conversion module shown in FIG. 1, it is possible to lock the longitudinal mode by other methods. For example, in the wavelength conversion module shown in FIG. 15, the laser beam 4 and the second harmonic thereof 4' emanating from the optical wavelength conversion element 20 are collimated by a collimator lens 50 and then the second harmonic 4' is reflected at a dichroic mirror 51 while the laser beam 4 is transmitted through the dichroic mirror 51 and reflected at a grating 52 to return to the semiconductor laser 3. That is, the longitudinal mode the semiconductor laser 3 is locked by virtue of wavelength selecting effect of the grating 52.

Figure 16:
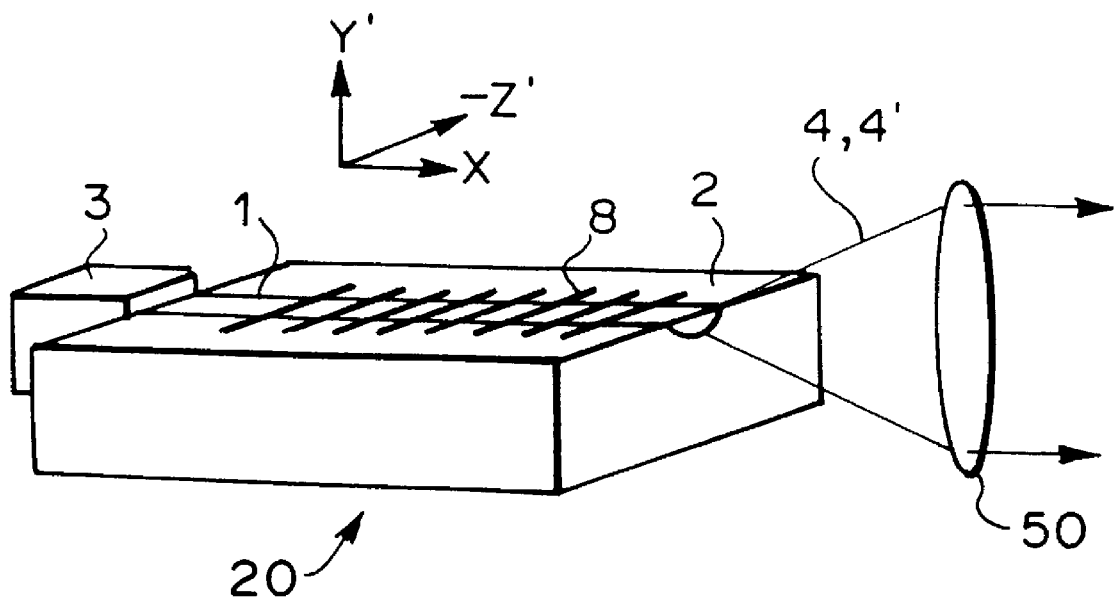
FIG. 16 is a schematic side view showing another example of an optical wavelength conversion module in accordance with the present invention.

In the wavelength conversion module shown in FIG. 16, the semiconductor laser 3 is directly coupled to an end face of the optical wavelength conversion element 20 and the longitudinal mode of the semiconductor laser 3 is locked by a DBR (distributed Bragg reflection) grating (not shown) formed in the active medium of the semiconductor laser 3.

Further the method of applying an electric field to the MgO-LN substrate 2 need not be limited to those described above, directly applying an electric voltage through electrodes, corona charging and irradiation of electron rays. For example, an electric field may be applied by irradiation of a focusing ion beam.

Though, in the MgO-LN substrate 2 described above, Z-axis and Y-axis are offset respectively from the directions parallel and normal to the substrate surface 2a, the similar result can be obtained when at least Z-axis is offset from the direction parallel to the substrate surface 2a.

In place of the optical waveguide formed by proton exchange and annealing, an optical waveguide formed by diffusing Ti may be employed.

What is claimed is:

1. An optical wavelength conversion element comprising:
an optical waveguide which is formed on a ferroelectric crystal substrate having a nonlinear optical effect and which extends along one surface of the substrate, and
domain reversals which are periodically formed in the optical waveguide and arranged in a direction, an orientation of polarization of the domain reversals being parallel to an orientation of spontaneous polarization of the substrate and the orientation of polarization being reversed in the domain reversals, and the optical wavelength conversion element being for converting a wavelength of a fundamental wave travelling in the direction in which the domain reversals are arranged under the guidance of the optical waveguide,
wherein the orientation of the spontaneous polarization of the substrate is at an angle θ larger than 0° and smaller than 90° to said one surface of the substrate in a plane normal to the direction in which the fundamental wave is guided.

2. An optical wavelength conversion element as defined in claim 1 in which the optical waveguide is formed by proton exchange and said angle θ is smaller than 70°.

3. An optical wavelength conversion element as defined in claim 1 in which the optical waveguide is formed by proton exchange and annealing and said angle θ is smaller than 20°.

4. An optical wavelength conversion element as defined in any one of claims 1 to 3 in which said angle θ is larger than 0.2°.

5. An optical wavelength conversion element as defined in claims 1 or 3 in which the optical waveguide is formed by proton exchange and annealing and said angle θ is larger than 0.5°.

6. An optical wavelength conversion element as defined in claim 1 in which the ferroelectric crystal substrate is formed of $LiNb_xTa_{1-x}O_3$ ($0 \leq x \leq 1$).

7. An optical wavelength conversion element as defined in claim 1 in which the ferroelectric crystal substrate is formed of $LiNbO_3$ doped with MgO.

8. The optical wavelength conversion element as defined in claim 1, wherein a relationship between a depth d in meters, of the domain reversals, and an inclined angle θ to the substrate is expressed by the formula:

$$d = L\tan\theta + 1 \ \mu m,$$

wherein L is a value related to a length in meters of each of the domain reversals along said one surface of the substrate, L being determined by a size of means for applying an electric field for reversing the orientation of polarization in the domain reversals, and by the value of the angle θ; and wherein m is a length in meters.

9. A method of manufacturing an optical wavelength conversion element comprising the steps of:

forming a substrate by cutting a single domain ferroelectric crystal having a nonlinear optical effect along a plane at an angle θ larger than 0° and smaller than 90° to the orientation of spontaneous polarization of the ferroelectric crystal, forming periodic domain reversals on the substrate by applying an electric field in a predetermined pattern to the substrate from outside the substrate, an orientation of polarization of the domain reversals being formed parallel to an orientation of spontaneous polarization in the substrate, and forming on the substrate an optical waveguide which includes the domain reversals and extends along a surface of the substrate parallel to the cut surface.

10. A method of manufacturing an optical wavelength conversion element as defined in claim 9 in which said electric field is applied through electrodes in a predetermined pattern mounted on the substrate.

11. A method of manufacturing an optical wavelength conversion element as defined in claim 10 in which an electric voltage is directly applied to the substrate through the electrodes.

12. A method of manufacturing an optical wavelength conversion element as defined in claims 9 or 10 in which said electric field is applied by a corona charging method.

13. A method of manufacturing an optical wavelength conversion element as defined in claims 9 or 10 in which said electric field is applied by an electron ray irradiation method.

14. An optical wavelength conversion module comprising an optical wavelength conversion element and a semiconductor laser for inputting a laser beam as a fundamental wave into an optical waveguide of the optical wavelength conversion element so that the laser beam is guided in a TE mode through the optical waveguide of the optical wavelength conversion element, said optical wavelength conversion element comprising:
an optical waveguide which is formed on a ferroelectric crystal substrate having a nonlinear optical effect and which extends along one surface of the substrate, and
domain reversals which are periodically formed in the optical waveguide and arranged in a direction, an orientation of polarization of the domain reversals being parallel to an orientation of spontaneous polarization of the substrate and the orientation of polarization being reversed in the domain reversals, the optical wavelength conversion element being for converting a wavelength of a fundamental wave travelling in the direction in which the domain reversals are arranged under the guidance of the optical waveguide, and the orientation of the spontaneous polarization of the substrate being at an angle θ larger than 0° and smaller than 90° to said one surface of the substrate in a plane normal to the direction in which the fundamental wave is guided.

* * * * *